United States Patent
Josso

(10) Patent No.: US 12,453,682 B2
(45) Date of Patent: Oct. 28, 2025

(54) COMPOSITION COMPRISING AT LEAST 5% BY WEIGHT OF TITANIUM OXIDES, AN α-CYANODIPHENYLACRYLATE DERIVATIVE AND A 4-HYDROXYBENZYLIDENEMALONATE OR 4-HYDROXYCINNAMATE DERIVATIVE

(71) Applicant: L'ORÉAL, Paris (FR)

(72) Inventor: Martin Josso, Chevilly la Rue (FR)

(73) Assignee: L'ORÉAL, Paris (FR)

( * ) Notice: Subject to any disclaimer, the term of this patent is extended or adjusted under 35 U.S.C. 154(b) by 536 days.

(21) Appl. No.: 17/784,181

(22) PCT Filed: Dec. 3, 2020

(86) PCT No.: PCT/EP2020/084500
§ 371 (c)(1),
(2) Date: Jun. 10, 2022

(87) PCT Pub. No.: WO2021/122039
PCT Pub. Date: Jun. 24, 2021

(65) Prior Publication Data
US 2023/0044544 A1    Feb. 9, 2023

(30) Foreign Application Priority Data
Dec. 20, 2019    (FR) ...................... 1915117

(51) Int. Cl.
*A61K 8/29*  (2006.01)
*A61K 8/37*  (2006.01)
*A61K 8/40*  (2006.01)
*A61Q 17/04* (2006.01)

(52) U.S. Cl.
CPC .................. *A61K 8/29* (2013.01); *A61K 8/37* (2013.01); *A61K 8/40* (2013.01); *A61Q 17/04* (2013.01); *A61K 2800/43* (2013.01); *A61K 2800/63* (2013.01)

(58) Field of Classification Search
None
See application file for complete search history.

(56) References Cited

U.S. PATENT DOCUMENTS

| 5,772,987 A | 6/1998 | Hansenne et al. |
| 5,788,973 A | 8/1998 | Ascione |
| 2011/0117036 A1* | 5/2011 | Chaudhuri ........... A61K 8/4973 424/59 |
| 2017/0172895 A1* | 6/2017 | Marigliano .............. A61K 8/31 |

FOREIGN PATENT DOCUMENTS

| EP | 0796613 A1 | 9/1997 |
| JP | H107526 A | 1/1998 |
| JP | H11503174 A | 3/1999 |
| JP | H11507392 A | 6/1999 |
| WO | 9702806 A1 | 1/1997 |
| WO | 2020069251 A1 | 4/2020 |

OTHER PUBLICATIONS

International Preliminary Report on Patentability issued on May 17, 2022, for corresponding PCT Application No. PCT/EP2020/084500.
International Search Report and Written Opinion issued on Mar. 11, 2021, for corresponding PCT Application No. PCT/EP2020/084500.
Database GNPD [Online]; Mintel; anonymous: "Photo-Brightening Moisturizer SPF 30", Feb. 2019 XP055723250.
Database GNPD [Online]; Mintel; anonymous: "Mineral One Daily Cream SPF 50+", Apr. 2020 XP055723305.

* cited by examiner

Primary Examiner — Nannette Holloman
(74) Attorney, Agent, or Firm — POLSINELLI PC

(57) ABSTRACT

The present invention relates to a composition comprising
1) at least one inorganic UV-screening agent chosen from titanium oxides;
2) at least one α-cyanodiphenylacrylate derivative of determined formula; and
3) at least one 4-hydroxybenzylidenemalonate or 4-hydroxycinnamate derivative of determined formula.

The present invention also relates to a cosmetic method for treating the skin against UV radiation using said composition.

22 Claims, No Drawings

COMPOSITION COMPRISING AT LEAST 5% BY WEIGHT OF TITANIUM OXIDES, AN α-CYANODIPHENYLACRYLATE DERIVATIVE AND A 4-HYDROXYBENZYLIDENEMALONATE OR 4-HYDROXYCINNAMATE DERIVATIVE

CROSS REFERENCE TO RELATED APPLICATIONS

This application is a National Phase filing under 35 U.S.C. § 371 of PCT/EP2020/084500 filed on Dec. 3, 2020; which application in turn claims priority to Application No. 1915117 filed in France on Dec. 20, 2019. The entire contents of each application are hereby incorporated by reference.

The present invention relates to a composition comprising at least 5% by weight, relative to the total weight of the composition, of at least one inorganic UV-screening agent chosen from titanium oxides, at least one α-cyanodiphenylacrylate derivative of determined formula, and at least one hydroxybenzylidenemalonate or 4-hydroxycinnamate derivative of determined formula.

The present invention also relates to a cosmetic method for treating the skin against UV radiation using said composition.

Light radiation with a wavelength of between 280 and 400 nm permits tanning of the human epidermis. Rays with a wavelength of between 280 and 320 nm, known as UVB rays, cause skin erythema and burns which can be detrimental to the development of a tan. Rays with a wavelength of between 320 and 400 nm, known as UVA rays, are capable of bringing about a detrimental change in the skin, notably with a loss of elasticity and the appearance of wrinkles, resulting in premature ageing.

UV rays should therefore be screened out. There currently exist cosmetic compositions for protecting the human epidermis, containing UV-screening agents which are active with regard to screening out UVA and UVB radiation.

Various types of sunscreens are available on the market for screening out UV-A and UV-B rays: mineral pigments and organic screening agents. These screening agents must be able to absorb or block the harmful rays of the sun while at the same time remaining harmless to the user.

Thus, many organic sunscreens that are capable of more or less selectively absorbing harmful UV rays have been proposed to date in the cosmetics field. However, for various reasons, these screening agents are not entirely satisfactory.

This is why it is increasingly sought to avoid the use of these organic screening agents by favouring the use of mineral pigments, which also act as sunscreens, mainly by scattering/reflecting UV rays, while at the same time affording the user greater safety.

In this respect, the mineral pigment most commonly used to date is titanium oxide, the screening properties of which are well known.

Moreover, other mineral screening agents such as zinc oxide are ecotoxic, and it is particularly desirable to propose sun protection products including titanium oxides as sunscreen.

However, in order to obtain suitable protection factors, it is necessary to be able to introduce into antisun compositions high percentages of $TiO_2$, in particular greater than or equal to 5% by weight.

However, with such $TiO_2$ contents, instability towards light is observed for compositions containing these pigments in an oxygen-free medium, which is manifested by the appearance of a blue colour. This light-induced colouring, which is known as photoblueing, is obviously undesirable from an aesthetic viewpoint.

Specifically, the titanium dioxide used as sunscreen has semiconductor properties. When it is exposed to ultraviolet light, the phenomenon of photoblueing reflects a chemical reaction potentially giving rise to free radicals, which can cause harmful effects on the skin.

It is thus desirable to propose antisun protection products with a high level of protection, including a high content of titanium dioxide as sole sunscreen, without any photoblueing.

EP 0 753 295 proposes the use of deformable hollow particles for limiting the photoblueing of antisun compositions comprising titanium oxides. However, these particles are considered as microplastics, which are undesirable ingredients in an antisun protection product.

There is thus a need for photoprotective compositions based on inorganic screening agents which are efficient and photostable.

Thus, the inventors have discovered that the introduction of an α-cyanodiphenylacrylate derivative of determined formula, and of a hydroxybenzylidenemalonate or 4-hydroxycinnamate derivative of determined formula in a composition containing $TiO_2$ pigments significantly reduces the photoblueing intrinsically associated with said composition.

This discovery forms the basis of the present invention.

Thus, one subject of the present invention is notably a composition, preferably a cosmetic composition, comprising:

1) at least one inorganic UV-screening agent chosen from titanium oxides;
2) at least one α-cyanodiphenylacrylate derivative of formula (I) below:

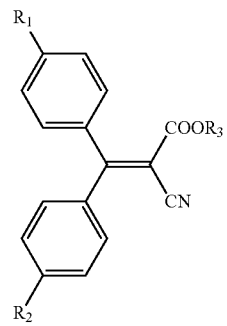

[chem 1]

in which:
R1 and R2 represent, independently of each other, a hydrogen atom, a linear or branched C1-C30 alkyl radical, or a linear or branched C1-C30 alkoxy radical;
R3 represents a linear or branched C1-C30, preferably C1-C24 and even more preferentially C1-12 alkyl radical; and 3) at least one 4-hydroxybenzylidenemalonate or 4-hydroxycinnamate derivative of formula (II) below:

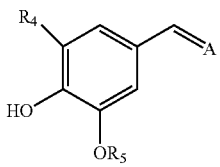

in which:
A is a chromophoric group which absorbs UV radiation, comprising two monovalent groups bearing a carbonyl function;
R4 denotes a hydrogen atom, a linear or branched $C_1$-$C_8$ alkyl radical, or a linear or branched $C_1$-$C_8$ alkoxy radical;
R5 denotes a hydrogen atom or a linear or branched $C_1$-$C_8$ alkyl radical.

The composition in accordance with the invention makes it possible to screen out UV rays highly efficiently, consequently leading to better skin protection.

The composition in accordance with the invention is light-stable, and no blue colouring appears in these compositions containing pigments of titanium oxide type in an oxygen-free medium.

Furthermore, the composition of the invention is also stable over time.

The composition of the invention moreover has good working properties. It spreads easily and allows uniform application without the appearance of a whitish film on the skin.

Moreover, the composition of the invention has good cosmetic properties, notably in terms of a non-glossy, non-greasy and non-tacky finish when applied to the skin.

A subject of the present invention is also a cosmetic method for treating the skin, in particular human skin, against UV radiation, which consists in applying to said skin the composition according to the invention.

According to a first particular embodiment, the composition in accordance with the invention does not comprise any piceid (polydatin).

According to a second particular embodiment, if the composition in accordance with the invention comprises piceid (polydatin), 2-ethylhexyl 2-cyano-3-(4-methoxyphenyl)-3-phenylpropenoate and diethylhexyl syringylidenemalonate, the total weight amount of piceid (polydatin), 2-ethylhexyl 2-cyano-3-(4-methoxyphenyl)-3-phenylpropenoate and diethylhexyl syringylidenemalonate is not equal to 3% by weight relative to the total weight of the composition.

According to a third particular embodiment, the composition in accordance with the invention does not comprise any piceid (polydatin), or resveratrol, or piceatannol, or pterostilbene.

According to a fourth particular embodiment, the composition in accordance with the invention does not contain any stilbenoids.

Stilbenoids are byproducts in the formation of the heartwood of trees, which have phytoalexin properties. In chemical terms, they are stilbene derivatives, often containing one or more phenolic functional groups. In biochemical terms, they belong to the family of phenylalanine derivatives known as phenylpropanoids. A large part of their biosynthetic pathway is shared with those of aromatic chalconoids, such as chalcone.

One botanical stilbenoid that is well characterized is resveratrol (3,5,4'-trihydroxy-trans-stilbene), a resorcinol derivative which was isolated for the first time in 1939 from white hellebore (*Veratrum album*), which is found in the skin of red grapes and in other fruit and nuts, including berries and groundnuts. Non-limiting examples of stilbenoids that may be mentioned include piceid (polydatin), resveratrol, piceatannol, pterostilbene and a mixture thereof.

Other subjects, characteristics, aspects and advantages of the invention will emerge even more clearly on reading the description and the examples that follow.

In the text hereinbelow, unless otherwise indicated, the limits of a range of values are included in that range, notably in the expressions "between" and "ranging from . . . to . . . ".

Moreover, the expressions "at least one" and "at least" used in the present description are equivalent to the expressions "one or more" and "greater than or equal to", respectively.

The level of sun protection is defined by the sun protection factor (SPF), which is expressed mathematically as the ratio of the exposure time necessary to reach the erythema-forming threshold with the UV screening agent to the time necessary to reach the erythema-forming threshold without UV screening agent.

It may be evaluated in vivo notably according to the method ISO 24444.

It may also be determined according to the in vitro method described by B. L. Diffey in J. Soc. Cosmet. Chem. 40, 127-133, (1989).

For the purposes of the present patent application, the term "highly efficient screening composition" refers to a composition having a sun protection factor (SPF) which can reach a value of at least 30, and preferably of at least 50.

The appearance of a blue colour is seen to a greater or lesser extent in the composition during exposure to light. The evaluation principle consists in exposing the test products to an irradiating light source whose spectral distribution is fully defined and for which the energy emitted is fully quantified. A CPS-Sun-Test machine is used, with which the illumination is provided by a xenon lamp between 300 and 800 nm.

The photoblueing can then be evaluated with the naked eye.

The photoblueing can also be evaluated by means of colorimetric measurements which are taken using a Minolta CM1000 colorimeter: a first measurement is recorded just before exposure to UV (TO) and a second after one hour of exposure to UV (T1H).

The results are expressed in the (L, a, b) system, in which L represents the luminance, a represents the red-green axis (−a=green, +a=red) and b represents the yellow-blue axis (−b=blue, +b=yellow).

To evaluate the photoblueing, the values of interest are the Δb, which measures the variation in the blue colour, the ΔL, which measures the darkening of the composition and the ΔE, which measures the variation in total colour. More precisely, Δb and ΔL are defined by $\Delta b = b_{T1H} - b_{T0}$ and $\Delta L = L_{T1H} - L_{T0}$. The smaller the value of Δb, the more efficient the protection against photoblueing.

ΔE is calculated from the variations ΔL, Δa and Δb according to the following formula:

$$|\Delta E| = \sqrt{(\Delta L)^2 + (\Delta a)^2 + (\Delta b)^2}.$$ [Math. 1]

According to the present invention, the term "stable over time" refers to a composition which, after one month, preferably after two months, of storage at a temperature ranging from 4° C. to 45° C., does not show any macroscopic change in colour, odour or viscosity, or any variation in pH, and also no variation in microscopic appearance.

The composition according to the invention is intended for topical application and thus contains a physiologically acceptable medium. The term "physiologically acceptable medium" means here a medium that is compatible with keratin materials.

In the context of the present invention, the term "keratin material" notably means the skin, the scalp, keratin fibres such as the eyelashes, the eyebrows, head hair, bodily hair, the nails, and mucous membranes such as the lips, and more particularly the skin (of the body, face, area around the eyes or eyelids, preferably of the body or face).

Mineral UV-Screening Agents

The composition according to the present invention comprises one or more mineral UV-screening agents chosen from titanium oxides.

According to the present invention, the term "UV-screening agent" is equivalent to the term "photoprotective agent".

The titanium oxide pigments may be coated or uncoated.

The coated pigments are pigments that have undergone one or more surface treatments of chemical, electronic, mechanochemical and/or mechanical nature with compounds such as amino acids, beeswax, fatty acids, fatty alcohols, anionic surfactants, lecithins, sodium, potassium, zinc, iron or aluminium salts of fatty acids, metal alkoxides (of titanium or aluminium), polyethylene, silicones, proteins (collagen, elastin), alkanolamines, silicon oxides, metal oxides or sodium hexametaphosphate.

The coated pigments are more particularly titanium oxides that have been coated:
  with silica, such as the product Sunveil from the company Ikeda, the product Eusolex T-AVO from the company Merck, and the product Sunsil TIN 50 from the company Sunjin;
  with silica and iron oxide, such as the product Sunveil F from the company Ikeda;
  with silica and alumina, such as the products Microtitanium Dioxide MT 500 SA and Microtitanium Dioxide MT 100 SA from the company Tayca and Tioveil from the company Croda;
  with alumina, such as the products Tipaque TTO-55 (B) and Tipaque TTO-55 (A) from the company Ishihara and UVT 14/4 from the company Sachtleben Pigments;
  with stearic acid and aluminium hydroxide, such as the products Microtitanium Dioxide MT 100 TV, MT 100 TX, MT 100 Z, MT-01 and MT 900Z from the company Tayca;
  with stearic acid and alumina, such as the product Solaveil XT-300-LQ from the company Croda;
  with aluminium stearate and alumina, such as the products Solaveil CT-10 W, Solaveil CT 100-LQ, Solaveil CT 200-LQ and Solaveil CT-300 LQ from the company Croda;
  with silica, alumina and alginic acid, such as the product MT-100 AQ from the company Tayca;
  with alumina and aluminium laurate, such as the product Microtitanium Dioxide MT 100 S from the company Tayca;
  with iron oxide and iron stearate, such as the product Microtitanium Dioxide MT 100 F from the company Tayca;
  with silica and alumina and treated with a silicone, such as the products Microtitanium Dioxide MT 600 SAS, Microtitanium Dioxide MT 500 SAS or Microtitanium Dioxide MT 100 SAS from the company Tayca;
  with silica, alumina and aluminium stearate and treated with a silicone, such as the product STT-30-DS from the company Titan Kogyo;
  with silica and treated with a silicone, such as the product UV-Titan X 195 from the company Sachtleben Pigments, and Parsol TX from the company DSM Nutritional Products;
  with alumina and treated with a silicone, such as the products Tipaque TTO-55 (S) from the company Ishihara or UV Titan M 262 from the company Sachtleben Pigments;
  with triethanolamine, such as the product STT-65-S from the company Titan Kogyo;
  with stearic acid, such as the product Tipaque TTO-55 (C) from the company Ishihara;
  with sodium hexametaphosphate, such as the product Microtitanium Dioxide MT 150 W from the company Tayca;
  $TiO_2$ treated with octyltrimethylsilane, notably sold under the trade name T 805 by the company Degussa Silices;
  $TiO_2$ treated with a polydimethylsiloxane, notably sold under the trade name 70250 Cardre UF TiO2SI3 by the company Cardre;
  anatase/rutile $TiO_2$ treated with a polydimethylhydrogenosiloxane, notably sold under the trade name Microtitanium Dioxide USP Grade Hydrophobic by the company Color Techniques.

Mention may also be made of $TiO_2$ pigments doped with at least one transition metal such as iron, zinc or manganese and more particularly manganese. Preferably, said doped pigments are in the form of an oily dispersion. The oil present in the oily dispersion is preferably chosen from triglycerides including those of capric/caprylic acids.

The oily dispersion of titanium oxide particles may also include one or more dispersants, for instance a sorbitan ester, for instance sorbitan isostearate, or a polyoxyalkylenated fatty acid ester of glycerol, for instance TRI-PPG-3 myristyl ether citrate and polyglyceryl-3 polyricinoleate. Preferably, the oily dispersion of titanium oxide particles includes at least one dispersant chosen from polyoxyalkylenated fatty acid esters of glycerol. Mention may more particularly be made of the oily dispersion of $TiO_2$ particles doped with manganese in capric/caprylic acid triglyceride in the presence of tri-PPG-3 myristyl ether citrate and polyglyceryl-3 polyricinoleate and of sorbitan isostearate (INCI name: titanium dioxide (and) tri-PPG-3 myristyl ether citrate (and) polyglyceryl-3 ricinoleate (and) sorbitan isostearate), such as the product notably sold under the trade name Optisol TD50 by the company Croda.

The uncoated titanium oxide pigments are sold, for example, by the company Tayca under the trade names Microtitanium Dioxide MT 500 B or Microtitanium Dioxide MT 600 B, by the company Degussa under the name P 25, by the company Wackher under the name Transparent titanium oxide PW, by the company Miyoshi Kasei under the name UFTR, by the company Tomen under the name ITS and by the company Tioxide under the name Tioveil AQ.

According to a particular embodiment of the invention, use will be made of titanium dioxide nanoparticles.

According to a preferred embodiment, these titanium dioxide particles have a number-average elementary particle diameter of less than 100 nm, preferentially less than 50 nm, determined by transmission electron microscopy (TEM) or scanning electron microscopy (SEM).

The composition may also contain titanium dioxide of larger size, used for its white colouring properties, optionally combined with iron oxides, to obtain a tinted product of foundation type, or a concealer product which whitens the skin.

The titanium oxide(s) are present in the composition according to the invention in an amount of greater than or equal to 5% by weight, preferably in an amount greater than or equal to 10% by weight and even more preferentially greater than or equal to 15% by weight relative to the total weight of the composition.

According to a particular embodiment of the invention, the titanium oxide(s) are present in an amount ranging from 5% to 25% by weight, preferably from 10% to 20% by weight, and even more preferentially from 12% to 18% by weight relative to the total weight of the composition.

According to a particular embodiment of the invention, the composition comprises an amount of organic UV-screening agents of less than 5% by weight, preferably less than 2% by weight, relative to the total weight of the composition. Advantageously, the composition in accordance with the invention is free of organic UV-screening agents.

According to another particular embodiment of the invention, the composition comprises an amount of inorganic UV-screening agents other than titanium oxides of less than 5% by weight, preferably less than 2% by weight, relative to the total weight of the composition. Advantageously, the composition in accordance with the invention is free of inorganic UV-screening agents other than titanium oxides.

α-Cyanodiphenylacrylate Derivatives

The composition comprises at least one α-cyanodiphenylacrylate derivative of formula (I) below:

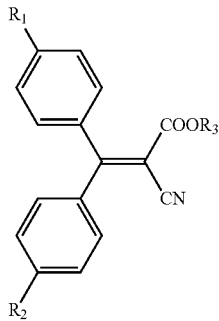

[chem 1]

in which:
R1 and R2 represent, independently of each other, a hydrogen atom, a linear or branched C1-C30 alkyl radical, or a linear or branched C1-C30 alkoxy radical;
R3 represents a linear or branched C1-C30, preferably C1-C24 and even more preferentially C1-12 alkyl radical.

According to a particular embodiment of the invention, R1 and R2, independently of each other, are chosen from a hydrogen atom and linear or branched C1-C30 and preferably C1-C8 alkoxy radicals.

According to a preferred embodiment, one of the groups R1 and R2 represents a hydrogen atom and the other represents a linear C1-C8 and preferably C1-C4 alkoxy radical. Even more preferentially, R1 represents a hydrogen atom and R2 represents a linear C1-C4 alkoxy radical, preferably a methoxy radical.

According to another particular embodiment of the invention, R3 represents a linear or branched C2-C20 alkyl radical.

According to a preferred embodiment, R3 represents a branched C3-C10 alkyl radical. Preferably, R3 represents a 2-ethylhexyl radical.

As examples of α-cyanodiphenylacrylate derivatives that may be used in the context of the invention, mention may be made of 2-ethylhexyl 2-cyano-3-(4-methoxyphenyl)-3-phenylpropenoate, in which R1 is a hydrogen atom, R2 is a methoxy radical and R3 is a 2-ethylhexyl radical, having the INCI name Ethylhexyl methoxycrylene, for instance the product Solastay® R1 sold by the company The Hallstar Company.

The α-cyanodiphenylacrylate derivative(s) of formula (I) may be present in the composition according to the invention in a concentration of greater than or equal to 0.5% by weight, preferably greater than or equal to 2% by weight and even more preferentially greater than or equal to 3% by weight relative to the total weight of the composition.

According to a particular embodiment, the α-cyanodiphenylacrylate derivative(s) of formula (I) may be present in the composition according to the invention in a concentration of between 0.5% and 5% by weight, preferably between 2% and 4% by weight and even more preferentially between 2.5% and 3.5% by weight relative to the total weight of the composition.

4-Hydroxybenzylidenemalonate or 4-Hydroxycinnamate Derivatives

The composition comprises at least one 4-hydroxybenzylidenemalonate or 4-hydroxycinnamate derivative of formula (II) below:

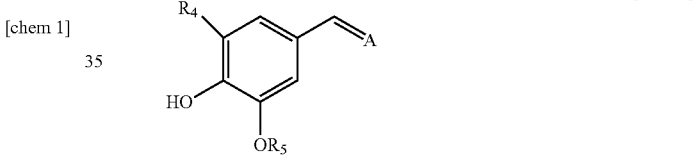

[chem2]

in which:
A is a chromophoric group which absorbs UV radiation, comprising two monovalent groups bearing a carbonyl function;
R4 denotes a hydrogen atom, a linear or branched $C_1$-$C_8$ alkyl radical, or a linear or branched $C_1$-$C_8$ alkoxy radical;
R5 denotes a hydrogen atom or a linear or branched $C_1$-$C_8$ alkyl radical.

According to a particular embodiment of the invention, use will be made of the compounds of formula (IIa) below:

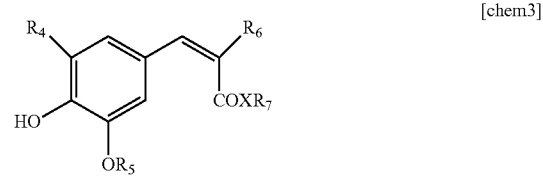

[chem3]

in which:
$R_4$ denotes a hydrogen atom, a linear or branched $C_1$-$C_8$ alkyl radical, or a linear or branched $C_1$-$C_8$ alkoxy radical;
$R_5$ denotes a hydrogen atom or a linear or branched $C_1$-$C_8$ alkyl radical;

$R_6$ is chosen from $-C(O)CH_3$, $-CO_2R_8$, $-C(O)NH_2$ and $-C(O)N(R_9)_2$;

$R_7$ denotes a linear or branched $C_1$-$C_{30}$ alkyl radical;

$R_8$ represents a linear or branched $C_1$-$C_{20}$ alkyl radical;

each $R_9$ independently represents a linear or branched $C_1$-$C_8$ alkyl radical;

X denotes O or NH.

Among these compounds, use will more preferentially be made of those of formula (IIb) or (IIc) below:

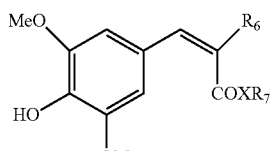
[chem4]

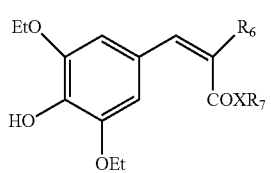
[chem5]

in which:

$R_6$ denotes $-CO_2R8$;

$R_7$ denotes a linear or branched $C_1$-$C_8$ alkyl;

$R_8$ denotes a linear or branched $C_1$-$C_8$ alkyl;

X denotes O.

Examples of compounds of formula (II) that may be mentioned include ethyl α-cyano-3,5-dimethoxy-4-hydroxycinnamate, ethyl α-acetyl-3,5-dimethoxy-4-hydroxycinnamate, isopropyl α-acetyl-3,5-dimethoxy-4-hydroxycinnamate, isoamyl α-acetyl-3,5-dimethoxy-4-hydroxycinnamate, 2-ethylhexyl α-acetyl-3,5-dimethoxy-4-hydroxycinnamate, diethyl 3,5-dimethoxy-4-hydroxybenzylidenemalonate, bis(2-ethylhexyl) 3,5-dimethoxy-4-hydroxybenzylidenemalonate, diisoamyl 3,5-dimethoxy-4-hydroxybenzylidenemalonate, didodecyl 3,5-dimethoxy-4-hydroxybenzylidenemalonate, dipalmitoyl 3,5-dimethoxy-4-hydroxybenzylidenemalonate, diisopropyl 3,5-dimethoxy-4-hydroxybenzylidenemalonate and diethylhexyl syringylidenemalonate.

Use will be made in particular of diethylhexyl syringylidenemalonate (INCI name: Diethylhexyl Syringylidenemalonate) having the following formula:

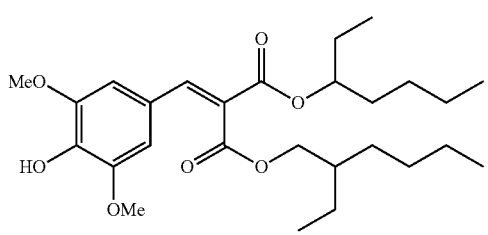
[chem6]

such as the commercial product sold under the trade name Oxynex ST by the company Merck, at 90% active material in caprylic/capric triglyceride.

The 4-hydroxybenzylidenemalonate or 4-hydroxycinnamate derivative(s) of formula (II) may be present in the composition according to the invention in a concentration of greater than or equal to 0.5% by weight, preferably greater than or equal to 1.5% by weight and even more preferentially greater than or equal to 2.5% by weight relative to the total weight of the composition.

According to a particular embodiment, the 4-hydroxybenzylidenemalonate or 4-hydroxycinnamate derivative(s) of formula (II) may be present in the composition according to the invention in a concentration of between 0.5% and 5% by weight, preferably between 2% and 4% by weight and even more preferentially between 2.5% and 3.5% by weight relative to the total weight of the composition.

Presentation Form

The composition in accordance with the invention may be in the form of an aqueous solution, an aqueous gel, an anhydrous product or in emulsion form, of oil-in-water or water-in-oil type.

The amount of oily phase generally ranges from 1% to 100%, preferably from 5% to 90% by weight and more preferentially from 10% to 80% by weight, relative to the total weight of the composition.

According to a first particular embodiment, the composition according to the invention is aqueous and is in the form of an aqueous solution or an aqueous gel.

For the purposes of the present invention, the term "aqueous" refers to a composition comprising an amount of fatty phase of less than 5% by weight, preferably less than 2% by weight relative to the total weight of the composition. Advantageously, the composition in accordance with the invention is essentially aqueous, i.e. it does not contain a fatty phase.

According to a second particular embodiment, the composition according to the invention is anhydrous.

The term "anhydrous" notably means that water is preferably not deliberately added to the composition, but may be present in trace amount in the various compounds used in the composition.

According to a third particular embodiment, the composition according to the invention is in the form of an oil-in-water emulsion (also known as a direct emulsion, or abbreviated as O/W emulsion), containing droplets of oil dispersed in a continuous aqueous phase.

According to a fourth particular embodiment, the composition according to the invention is in the form of a water-in-oil emulsion (also known as an inverse emulsion, or abbreviated as W/O emulsion) containing droplets of aqueous phase dispersed in a continuous oily phase.

Preferably, the composition in accordance with the invention is in the form of a water-in-oil emulsion.

Aqueous Phase

The composition according to the invention advantageously comprises at least one aqueous phase.

The aqueous phase contains water and optionally at least one water-soluble or water-miscible organic solvent.

An aqueous phase that is suitable for use in the invention may comprise, for example, a water chosen from a natural spring water, such as water from La Roche-Posay, water from Vittel or waters from Vichy, or a floral water.

The water-soluble or water-miscible solvents that are suitable for use in the invention comprise short-chain monoalcohols, for example C1-C4 monoalcohols, such as ethanol or isopropanol; diols or polyols, such as ethylene glycol, 1,2-propylene glycol, 1,3-butylene glycol, hexylene glycol, diethylene glycol, dipropylene glycol, 1,3-propanediol, pentylene glycol, hexylene glycol, caprylyl glycol, glycerol (glycerine), sorbitol, ethers such as 2-ethoxyethanol, diethylene glycol monomethyl ether, triethylene glycol monomethyl ether, and mixtures thereof.

According to a preferred embodiment, use may more particularly be made of ethanol, propylene glycol, glycerol, 1,3-propanediol, or a mixture thereof.

According to a particular embodiment of the invention, the aqueous phase represents from 10% to 90% by weight, preferentially from 20% to 70% by weight and better still from 30% to 50% by weight, relative to the total weight of the composition.

Oily Phase

The composition in accordance with the invention may comprise at least one oily phase.

For the purposes of the invention, the term "oily phase" means a phase comprising at least one oil and all of the liposoluble and lipophilic ingredients and the fatty substances used for the formulation of the compositions of the invention.

The term "oil" means any fatty substance that is in liquid form at room temperature (20-25° C.) and atmospheric pressure (760 mmHg). An oil that is suitable for use in the invention may be volatile or non-volatile.

The oil may be chosen from hydrocarbon-based oils, silicone oils and fluoro oils, and mixtures thereof. A hydrocarbon-based oil that is suitable for use in the invention may be an animal hydrocarbon-based oil, a plant hydrocarbon-based oil, a mineral hydrocarbon-based oil or a synthetic hydrocarbon-based oil. An oil that is suitable for use in the invention may be advantageously chosen from mineral hydrocarbon-based oils, plant hydrocarbon-based oils, synthetic hydrocarbon-based oils and silicone oils, and mixtures thereof.

For the purposes of the present invention, the term "silicone oil" means an oil comprising at least one silicon atom, and notably at least one Si—O group.

The term "hydrocarbon-based oil" means an oil mainly containing hydrogen and carbon atoms.

The term "fluoro oil" means an oil comprising at least one fluorine atom.

A hydrocarbon-based oil that is suitable for use in the invention may also optionally comprise oxygen, nitrogen, sulfur and/or phosphorus atoms, for example in the form of hydroxyl, amine, amide, ester, ether or acid groups, and in particular in the form of hydroxyl, ester, ether or acid groups.

For the purposes of the invention, the term "volatile oil" means an oil that is capable of evaporating on contact with the skin or the keratin fibre in less than one hour, at room temperature and atmospheric pressure. The volatile oil(s) of the invention are volatile cosmetic oils, which are liquid at room temperature, having a non-zero vapour pressure, at room temperature and atmospheric pressure, ranging in particular from 0.13 Pa to 40 000 Pa (10' to 300 mmHg), in particular ranging from 1.3 Pa to 13 000 Pa (0.01 to 100 mmHg) and more particularly ranging from 1.3 Pa to 1300 Pa (0.01 to 10 mmHg).

The term "non-volatile oil" means an oil that remains on the skin or the keratin fibre at room temperature and atmospheric pressure for at least several hours, and that notably has a vapour pressure of less than $10^{-3}$ mmHg (0.13 Pa).

Hydrocarbon-Based Oils

As non-volatile hydrocarbon-based oils that may be used according to the invention, mention may notably be made of:
(i) hydrocarbon-based oils of plant origin, such as glyceride triesters, which are generally triesters of fatty acids and of glycerol, the fatty acids of which may have varied chain lengths from C4 to C24, these chains possibly being linear or branched, and saturated or unsaturated; these oils are notably wheatgerm oil, sunflower oil, grapeseed oil, sesame seed oil, corn oil, apricot oil, castor oil, shea oil, avocado oil, olive oil, soybean oil, sweet almond oil, palm oil, rapeseed oil, cottonseed oil, hazelnut oil, macadamia oil, jojoba oil, alfalfa oil, poppy oil, pumpkin oil, sesame seed oil, marrow oil, rapeseed oil, blackcurrant oil, evening primrose oil, millet oil, barley oil, quinoa oil, rye oil, safflower oil, candlenut oil, passion flower oil and musk rose oil; or caprylic/capric acid triglycerides such as those sold by the company Stéarinerie Dubois or those sold under the names Miglyol 810, 812 and 818 by the company Sasol;
(ii) synthetic ethers containing from 10 to 40 carbon atoms;
(iii) linear or branched hydrocarbons of mineral or synthetic origin, such as petroleum jelly, polydecenes, hydrogenated polyisobutene, such as Parleam, squalane and mixtures thereof;
(iv) synthetic esters, such as the oils of formula RCOOR' in which R represents a linear or branched fatty acid residue including from 1 to 40 carbon atoms and R' represents a hydrocarbon-based chain that is notably branched, containing from 1 to 40 carbon atoms, with the proviso that R+R'>10, for instance purcellin oil (cetostearyl octanoate), isopropyl myristate, isopropyl palmitate, C12-C15 alkyl benzoate, such as the product sold under the trade name Finsolv TN or Witconol TN by the company Innospec Active Chemicals or Tegosoft TN by the company Evonik Goldschmidt, 2-ethylphenyl benzoate, such as the commercial product sold under the name X-Tend 226 by the company ISP, isopropyl lanolate, hexyl laurate, diisopropyl adipate, isononyl isononanoate, oleyl erucate, 2-ethylhexyl palmitate, isostearyl isostearate, diisopropyl sebacate such as the product sold under the name Dub Dis by the company Stearinerie Dubois, alcohol or polyalcohol octanoates, decanoates or ricinoleates, such as propylene glycol dioctanoate; hydroxylated esters, such as isostearyl lactate, diisostearyl malate; and pentaerythritol esters; citrates or tartrates, such as linear C12-C13 dialkyl tartrates, such as those sold under the name Cosmacol ETI by the company Sasol, and also linear C14-C15 dialkyl tartrates such as those sold under the name Cosmacol ETL by the same company; acetates;
(v) fatty alcohols that are liquid at room temperature, bearing a branched and/or unsaturated carbon-based chain containing from 12 to 26 carbon atoms, for instance octyldodecanol, isostearyl alcohol, oleyl alcohol, 2-hexyldecanol, 2-butyloctanol or 2-undecylpentadecanol;
(vi) higher fatty acids, such as oleic acid, linoleic acid or linolenic acid; (vii) carbonates such as dicaprylyl carbonate, for instance the product sold under the name Cetiol CC by the company BASF;
(viii) fatty amides, such as isopropyl N-lauroyl sarcosinate, such as the product sold under the trade name Eldew SL 205 by the company Ajinomoto, and mixtures thereof.

Among the non-volatile hydrocarbon-based oils that may be used according to the invention, preference will be given more particularly to glyceride triesters and notably to caprylic/capric acid triglycerides, synthetic esters and notably isononyl isononanoate, diisopropyl sebacate, C12-C15 alkyl benzoate, 2-ethylphenyl benzoate and fatty alcohols, notably octyldodecanol.

As volatile hydrocarbon-based oils that may be used according to the invention, mention may notably be made of hydrocarbon-based oils containing from 8 to 16 carbon atoms and notably branched C8-C16 alkanes, such as C8-C16 isoalkanes of petroleum origin (also known as isoparaffins), such as isododecane (also known as 2,2,4,4,6-pentamethylheptane), isodecane or isohexadecane, the oils sold under the Isopar or Permethyl trade names, branched C8-C16 esters, isohexyl neopentanoate, and mixtures thereof.

Mention may also be made of the alkanes described in the Cognis patent applications WO 2007/068 371 or WO 2008/155 059 (mixtures of different alkanes differing by at least one carbon). These alkanes are obtained from fatty alcohols, which are themselves obtained from coconut kernel oil or palm oil. Mention may be made of mixtures of n-undecane (C11) and of n-tridecane (C13) obtained in Examples 1 and 2 of patent application WO 2008/155059 by the company Cognis.

Mention may also be made of n-dodecane (C12) and n-tetradecane (C14) sold by Sasol under the references, respectively, Parafol 12-97 and Parafol 14-97, and also mixtures thereof.

Other volatile hydrocarbon-based oils, for instance petroleum distillates, notably those sold under the name Shell Sol by the company Shell, may also be used.

According to one embodiment, the volatile solvent is chosen from volatile hydrocarbon-based oils containing from 8 to 16 carbon atoms, and mixtures thereof.

Silicone Oils

The non-volatile silicone oils may be notably chosen from non-volatile polydimethylsiloxanes (PDMSs), polydimethylsiloxanes including alkyl or alkoxy groups which are pendent and/or at the end of the silicone chain, these groups each containing from 2 to 24 carbon atoms, or phenyl silicones, such as phenyl trimethicones, phenyl dimethicones, phenyltrimethylsiloxydiphenylsiloxanes, diphenyl dimethicones, diphenylmethyldiphenyltrisiloxanes or 2-phenylethyl trimethylsiloxysilicates.

Volatile silicone oils that may be mentioned, for example, include volatile linear or cyclic silicone oils, notably those with a viscosity of 8 centistokes ($8.10 \times 10^{-6}$ m$^2$/s) and notably containing from 2 to 7 silicon atoms, these silicones optionally including alkyl or alkoxy groups containing from 1 to 10 carbon atoms. As volatile silicone oils that may be used in the invention, mention may notably be made of octamethylcyclotetrasiloxane, decamethylcyclopentasiloxane, dodecamethylcyclohexasiloxane, heptamethylhexyltrisiloxane, heptamethyloctyltrisiloxane, hexamethyldisiloxane, octamethyltrisiloxane, decamethyltetrasiloxane and dodecamethylpentasiloxane, and mixtures thereof.

Mention may also be made of the volatile linear alkyltrisiloxane oils of general formula (III):

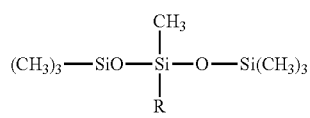

[chem7]

in which R represents an alkyl group comprising from 2 to 4 carbon atoms and of which one or more hydrogen atoms may be substituted with one or more fluorine or chlorine atoms.

Among the oils of general formula (III), mention may be made of: 3-butyl-1,1,1,3,5,5,5-heptamethyltrisiloxane, 3-propyl-1,1,1,3,5,5,5-heptamethyltrisiloxane and 3-ethyl-1,1,1,3,5,5,5-heptamethyltrisiloxane, corresponding to the oils of formula (III) for which R is, respectively, a butyl group, a propyl group or an ethyl group.

Fluoro Oils

Use may also be made of volatile fluoro oils, such as nonafluoromethoxybutane, decafluoropentane, tetradecafluorohexane, dodecafluoropentane, and mixtures thereof.

The oily phase may also comprise other fatty substances. Another fatty substance that may be present in the oily phase may be, for example:

a fatty acid chosen from fatty acids including from 8 to 30 carbon atoms, such as stearic acid, lauric acid, palmitic acid and oleic acid;

a wax chosen from waxes such as lanolin, beeswax, carnauba or candelilla wax, rice bran wax, paraffin waxes, lignite waxes, microcrystalline waxes, ceresin or ozokerite, or synthetic waxes, such as polyethylene waxes or Fischer-Tropsch waxes;

a gum chosen from silicone gums (dimethiconol);

a pasty compound, such as polymeric or non-polymeric silicone compounds, esters of a glycerol oligomer, arachidyl propionate, fatty acid triglycerides and derivatives thereof;

and mixtures thereof.

Preferentially, the oily phase represents from 5% to 95% by weight, preferentially from 10% to 80% by weight and better still from 20% to 50% by weight relative to the total weight of the composition.

Efficiency Boosters

The composition according to the present invention may optionally also comprise one or more efficiency boosters.

For the purposes of the present application, the term "efficiency booster" means a raw material which does not itself screen out UV radiation, but which makes it possible to amplify the screening performance of the composition of the invention.

Examples of efficiency boosters that may be mentioned include particles of copolymer of styrene and of acrylates, such as those sold under the name Sunspheres Powder by Dow Chemicals; waxes such as polymethylene wax (Cirebelle 303 sold by Cirebelle); gelling lipophilic polymers such as the semicrystalline polyacrylates sold under the names Interlimer IPA 13-1, Interlimer IPA 13-6 or Uniclear 100 VG; and mixtures thereof.

Insoluble Particles

The composition according to the present invention may optionally also comprise one or more insoluble particles, not having any UV-screening property or efficiency booster property.

These particles make it possible to obtain excellent sensory or optical properties after application of the composition to the skin.

These particles may be chosen from nylon, such as Orgasol 2002 sold by Arkema; polymethylsilsesquioxane, for instance the methylsilsesquioxane resin microbeads sold under the name Tospearl 145A by the company Momentive Performance Materials; polymethyl methacrylate, for instance the hollow PMMA spheres sold under the name Covabeads LH 85 by the company Sensient; starches such as corn starch; talc; silica; crosslinked polyacrylate microspheres such as Aquakeep 10 SH-NFC sold by the company Sumitomo Seika; perlite such as Optimat 2550 OR sold by the company World Minerals; iron oxide pigments or titanium oxide pigments, and mixtures thereof.

Preferably, the composition according to the invention also comprises nylon particles, such as Orgasol 2002.

Additives

The composition according to the present invention may optionally also comprise one or more additives, different from the compounds of the invention and usually used in cosmetics, and particularly in the field of antisun products, care products and makeup products.

The aqueous phase may optionally comprise surfactants; active agents; salts; organic particles; amphiphilic polymers, such as the Pemulens TR1 or TR2 or Carbopol ETD2020, sold by the company Lubrizol; hydrophilic polymers, such as poly(N-vinylpyrrolidone); polysaccharides, for instance guar gums, xanthan gums and cellulose-based derivatives; water-soluble or water-dispersible silicone derivatives, for instance acrylic silicones, polyether silicones and cationic silicones; and mixtures thereof.

As active agents, mention may notably be made of vitamins (A, C, E, K, PP, etc.), alone or as a mixture, and also derivatives thereof; keratolytic and/or desquamating agents (salicylic acid and derivatives thereof, α-hydroxy acids, ascorbic acid and derivatives thereof); antiinflammatory agents; calmatives; depigmenting agents; tensioning agents such as synthetic polymers; plant proteins; polysaccharides of plant origin optionally in the form of microgels; wax dispersions; mixed silicates and colloidal particles of inorganic fillers; matting agents; agents for preventing hair loss and/or hair restorers; anti-wrinkle agents; and mixtures thereof.

The oily phase may optionally also comprise lipophilic gelling agents; surfactants; organic or mineral particles; and mixtures thereof.

Needless to say, a person skilled in the art will take care to select this or these optional additional compounds such that the advantageous properties intrinsically associated with the composition according to the invention are not, or are not substantially, adversely affected by the envisaged addition(s).

The above additives may generally be present in an amount, for each of them, of between 0 and 20% by weight relative to the total weight of the composition.

A subject of the present invention is also a cosmetic method for treating the skin, in particular human skin, against UV radiation, which consists in applying to the skin the composition according to the invention.

Preferably, the UV radiation corresponds to solar radiation.

More particularly, a subject of the present invention is a cosmetic method for limiting the darkening of the skin and/or improving the colour and/or uniformity of the complexion, comprising the application, to the surface of the skin, of at least one composition as defined above.

A subject of the invention is also a non-therapeutic cosmetic method for preventing and/or treating the signs of ageing of the skin, comprising the application to the surface of the skin of at least one composition as defined above.

A subject of the present invention is also a composition as defined previously, for its use against UV radiation, in particular against solar radiation.

A subject of the present invention is also the use of the combination of an α-cyanodiphenylacrylate derivative of formula (I) and of a 4-hydroxybenzylidenemalonate or 4-hydroxycinnamate derivative of formula (II) as defined previously, for reducing the photoblueing of a composition comprising at least one inorganic UV-screening agent chosen from titanium oxides.

The examples that follow serve to illustrate the invention without, however, being limiting in nature.

EXAMPLES

The amounts are indicated as weight percentages of starting material (SM) relative to the total weight of the composition, unless otherwise mentioned. The names of the compounds are given as the chemical names or the INCI names.

Method for Preparing the Emulsion

The ingredients of the fatty phase are mixed together without heating. The titanium dioxide is added and the whole is homogenized until a uniform mixture is obtained. The ingredients of the aqueous phase are mixed together without heating. The alcohol is added.

The fatty phase and the aqueous phase are emulsified without heating.

Protocol for Evaluating the Photoblueing

The principle of these tests consists in exposing the test products to an irradiating light source whose spectral distribution is fully defined and for which the energy emitted is fully quantified. The light sources commonly used are xenon lamps emitting through:

a platinized quartz filter which diverts the infrared radiation and removes it via the top of the machine;

and a glass filter which, by absorbing the short ultraviolet radiation, makes it possible to simulate the radiation received behind a presentation window.

A CPS Sun-Test machine is used:

the illumination provided by a xenon lamp between 300 and 800 nm is set at 765 W/m$^2$ (value set by the manufacturer);

the optical filtration is performed by a quartz filter with IR coating and special sheet glass).

The colour of each flask before and after exposure to the light is then observed with the naked eye.

TABLE 1

| Composition | A (comparative) | B (comparative) | C (comparative) | D (invention) |
|---|---|---|---|---|
| Sodium hyaluronate (MW: 1 100 000) powder | 0.02 | 0.02 | 0.02 | 0.02 |
| Diethylhexyl syringylidenemalonate in caprylic/capric triglyceride (Oxynex ST from Merck) | — | 3 | — | 3 |

TABLE 1-continued

| Composition | A (comparative) | B (comparative) | C (comparative) | D (invention) |
|---|---|---|---|---|
| Citric acid monohydrate | 0.01 | 0.01 | 0.01 | 0.01 |
| Hectorite modified with stearylbenzyldimethylammonium | 0.35 | 0.35 | 0.35 | 0.35 |
| Isopropyl palmitate | 17.42 | 14.42 | 14.42 | 11.42 |
| Isocetyl stearate | 2 | 2 | 2 | 2 |
| Diisopropyl sebacate | 7 | 7 | 7 | 7 |
| Polyglyceryl polyricinoleate | 2.5 | 2.5 | 2.5 | 2.5 |
| Rutile titanium oxide surface-treated with stearic acid and aluminium hydroxide (MT-100TV from Tayca) | 13.04 | 13.04 | 13.04 | 13.04 |
| Rutile titanium oxide treated with aluminium hydroxide and stearic acid (MT-900Z from Tayca) | 2 | 2 | 2 | 2 |
| Dispersion containing 35% titanium dioxide, treated with aluminium stearate and alumina, dispersed with polyhydroxystearic acid in capric/caprylic triglyceride (Solaveil CT-300-LQ from Croda) | 8.36 | 8.36 | 8.36 | 8.36 |
| Fragrance | 0.3 | 0.3 | 0.3 | 0.3 |
| Polysaccharides (xanthan gum, sclerotium gum, pullulan) with lecithin | 0.5 | 0.5 | 0.5 | 0.5 |
| Denatured absolute ethyl alcohol | 5 | 5 | 5 | 5 |
| Water | 31 | 31 | 31 | 31 |
| Glycerol | 6 | 6 | 6 | 6 |
| 1,2-Octanediol | 0.5 | 0.5 | 0.5 | 0.5 |
| 1,3-Propanediol | 3 | 3 | 3 | 3 |
| Ethylhexyl methoxycrylene (Solastay S1 from The Hallstar Company) | — | — | 3 | 3 |
| Vitamin E | 1 | 1 | 1 | 1 |

After two hours of exposure to the light in a transparent glass flask, composition D in accordance with the invention comprising a combination of an α-cyanodiphenylacrylate derivative (Oxynex ST) and a 4-hydroxybenzylidenemalonate or 4-hydroxycinnamate derivative (Solastay S1) does not show any significant photoblueing, in contrast with the Comparative Compositions A to C comprising neither any α-cyanodiphenylacrylate derivative (Oxynex ST) nor any 4-hydroxybenzylidenemalonate or 4-hydroxycinnamate derivative (Solastay S1) or comprising only one of these derivatives from among α-cyanodiphenylacrylate (Oxynex ST) and 4-hydroxybenzylidenemalonate or 4-hydroxycinnamate (Solastay S1).

Thus, the combined use of an α-cyanodiphenylacrylate derivative and of a 4-hydroxybenzylidenemalonate or 4-hydroxycinnamate derivative makes it possible to very significantly reduce the photoblueing of a composition comprising a titanium oxide.

The invention claimed is:

1. A composition comprising:
   at least one inorganic UV-screening agent chosen from titanium oxides in an amount of greater than or equal to 5% by weight relative to the total weight of the composition;
   at least one α-cyanodiphenylacrylate derivative of formula (I) below:

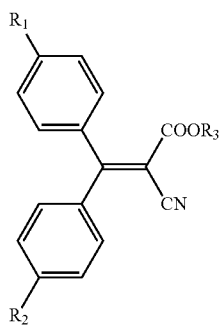

[chem 1]

in which:
R$_1$ and R$_2$ represent, independently of each other, a hydrogen atom, a linear or branched C$_1$-C$_{30}$ alkyl radical, or a linear or branched C$_1$-C$_{30}$ alkoxy radical;
R$_3$ represents a linear or branched C$_1$-C$_{30}$ alkyl radical; and
at least one 4-hydroxybenzylidenemalonate or 4-hydroxycinnamate derivative of formula (II) below:

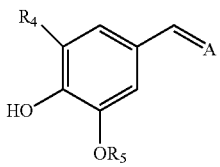

[chem2]

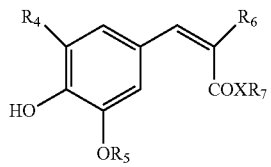

[chem3]

in which:
A is a chromophoric group which absorbs UV radiation, comprising two monovalent groups bearing a carbonyl function;
$R_4$ denotes a hydrogen atom, a linear or branched $C_1$-$C_8$ alkyl radical or a linear or branched $C_1$-$C_8$ alkoxy radical;
$R_5$ denotes a hydrogen atom or a linear or branched $C_1$-$C_8$ alkyl radical.

2. The composition according to claim 1, in which the at least one inorganic UV-screening agent is chosen from coated or uncoated titanium oxides.

3. The composition according to claim 1, in which the at least one inorganic UV-screening agent is a coated titanium oxide pigment that has undergone one or more surface treatments of chemical, electronic, mechanochemical and/or mechanical nature with a compound.

4. The composition according to claim 1, in which the at least one inorganic UV-screening agent chosen from titanium oxides has a number-average elementary particle diameter of less than 100 nm determined by transmission electron microscopy or scanning electron microscopy.

5. The composition according to claim 1, in which the at least one inorganic UV-screening agent chosen from titanium oxides is in an amount of greater than or equal to 10% by weight relative to the total weight of the composition.

6. The composition according to claim 1, in which, in formula (I), $R_1$ and $R_2$ independently of each other, are chosen from a hydrogen atom and linear or branched $C_1$-$C_{30}$ alkoxy radicals.

7. The composition according to claim 1, in which, in formula (I), one of the groups $R_1$ and $R_2$ represents a hydrogen atom, and the other represents a linear $C_1$-$C_8$ alkoxy radical.

8. The composition according to claim 1, in which, in formula (I), $R_3$ represents a linear or branched $C_2$-$C_{20}$ alkyl radical.

9. The composition according to claim 1, in which, in formula (I), $R_3$ represents a branched $C_1$-$C_{10}$ alkyl radical.

10. The composition according to claim 1, in which the at least one α-cyanodiphenylacrylate derivative of formula (I) is 2-ethylhexyl 2-cyano-3-(4-methoxyphenyl)-3-phenylpropenoate.

11. The composition according to claim 1, in which the at least one α-cyanodiphenylacrylate of formula (I) is present in a concentration of greater than or equal to 0.5% by weight relative to the total weight of the composition.

12. The composition according to claim 1, in which the at least one 4-hydroxybenzylidenemalonate or 4-hydroxycinnamate derivative of formula (II) is chosen from the compounds of formula (IIa) below:

in which:
$R_4$ denotes a hydrogen atom, a linear or branched $C_1$-$C_8$ alkyl radical, or a linear or branched $C_1$-$C_8$ alkoxy radical;
$R_5$ denotes a hydrogen atom or a linear or branched $C_1$-$C_8$ alkyl radical;
$R_6$ is chosen from —C(O)CH$_3$, —CO$_2$R$_8$, —C(O)NH$_2$ and —C(O)N(R$_9$)$_2$;
$R_7$ denotes a linear or branched $C_1$-$C_{30}$ alkyl radical;
$R_8$ represents a linear or branched $C_1$-$C_{20}$ alkyl radical;
each $R_9$ independently represents a linear or branched $C_1$-$C_8$ alkyl radical;
X denotes O or NH.

13. The composition according to claim 1, in which the at least one 4-hydroxybenzylidenemalonate or 4-hydroxycinnamate derivative of formula (II) is chosen from the compounds of formula (IIb) or (IIc) below:

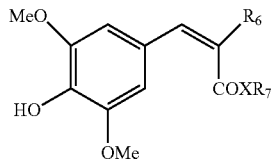

[chem4]

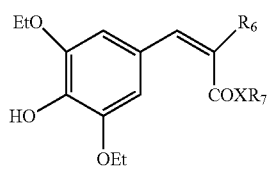

[chem5]

in which:
$R_6$ denotes —CO$_2$R$_8$;
$R_7$ denotes a linear or branched $C_1$-$C_8$ alkyl;
$R_8$ denotes a linear or branched $C_1$-$C_8$ alkyl;
X denotes O.

14. The composition according to claim 1, in which the at least one 4-hydroxybenzylidenemalonate or 4-hydroxycinnamate derivative of formula (II) is chosen from ethyl α-cyano-3,5-dimethoxy-4-hydroxycinnamate, ethyl α-acetyl-3,5-dimethoxy-4-hydroxycinnamate, isopropyl α-acetyl-3,5-dimethoxy-4-hydroxycinnamate, isoamyl α-acetyl-3,5-dimethoxy-4-hydroxycinnamate, 2-ethylhexyl α-acetyl-3,5-dimethoxy-4-hydroxycinnamate, diethyl 3,5-dimethoxy-4-hydroxybenzylidenemalonate, bis(2-ethylhexyl) 3,5-dimethoxy-4-hydroxybenzylidenemalonate, diisoamyl 3,5-dimethoxy-4-hydroxybenzylidenemalonate, didodecyl 3,5-dimethoxy-4-hydroxybenzylidenemalonate, dipalmitoyl 3,5-dimethoxy-4-hydroxybenzylidenemalonate, diisopropyl 3,5-dimethoxy-4-hydroxybenzylidenemalonate and diethylhexyl syringylidenemalonate.

15. The composition according to claim 1, in which the at least one 4-hydroxybenzylidenemalonate or 4-hydroxycinnamate derivative of formula (II) is diethylhexyl syringylidenemalonate.

16. The composition according to claim 1, in which the at least one 4-hydroxybenzylidenemalonate or 4-hydroxycinnamate derivative of formula (II) is present in a concentration of greater than or equal to 0.5% by weight relative to the total weight of the composition.

17. The composition according to claim 1, in which the amount of organic UV-screening agents is less than 5% by weight relative to the total weight of the composition.

18. The composition according to claim 1, in which the amount of inorganic UV-screening agents other than titanium oxides is less than 5% by weight relative to the total weight of the composition.

19. The composition according to claim 1, having a sun protection factor (SPF) with a value of at least 30.

20. A cosmetic method for treating the skin against UV radiation, which comprises applying to the skin a composition as defined in claim 1.

21. The composition according to claim 1, wherein the amount of the at least one inorganic UV-screening agent chosen from titanium oxides is 5% to 25% by weight relative to the total weight of the composition; the amount of the at least one α-cyanodiphenylacrylate derivative of formula (I) is between 0.5% and 5% by weight relative to the total weight of the composition; and the amount of the of at least one 4-hydroxybenzylidenemalonate or 4-hydroxycinnamate derivative of formula (II) is between 0.5% and 5% by weight relative to the total weight of the composition.

22. The composition according to claim 1, being an aqueous gel, an oil-in-water emulsion or water-in-oil emulsion.

\* \* \* \* \*